(12) United States Patent
Klawinski et al.

(10) Patent No.: US 11,489,277 B2
(45) Date of Patent: Nov. 1, 2022

(54) ELECTRICAL CONNECTOR AND METHOD OF MAKING AN ELECTRICAL CONNECTOR

(71) Applicant: Lear Corporation, Southfield, MI (US)

(72) Inventors: Robert Klawinski, Remscheid (DE); Sven Vesper, Remscheid (DE); Michaela Weger, Remscheid (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/186,709

(22) Filed: Feb. 26, 2021

(65) Prior Publication Data
US 2021/0281001 A1 Sep. 9, 2021

(30) Foreign Application Priority Data
Mar. 6, 2020 (DE) .......................... 102020106194.3

(51) Int. Cl.
| | | |
|---|---|---|
| *H01R 13/18* | (2006.01) | |
| *H01R 13/422* | (2006.01) | |
| *H01R 13/627* | (2006.01) | |
| *H01R 43/16* | (2006.01) | |
| *H01R 13/426* | (2006.01) | |

(52) U.S. Cl.
CPC ........... *H01R 13/18* (2013.01); *H01R 13/422* (2013.01); *H01R 13/426* (2013.01); *H01R 13/6271* (2013.01); *H01R 43/16* (2013.01)

(58) Field of Classification Search
CPC .... H01R 13/18; H01R 13/422; H01R 13/426; H01R 13/6271; H01R 43/16
USPC ......................................................... 439/839
See application file for complete search history.

(56) References Cited

U.S. PATENT DOCUMENTS

| | | | | |
|---|---|---|---|---|
| 3,598,550 A | * | 8/1971 | Takahashi et al. ...... | H01B 1/02 428/416 |
| 3,886,650 A | * | 6/1975 | Cobaugh .............. | H05K 3/3478 228/136 |
| 4,357,069 A | * | 11/1982 | Milora ................. | H05K 3/3405 439/876 |
| 4,437,236 A | * | 3/1984 | Oswald, Jr. ............ | B23K 20/04 228/115 |
| 7,972,710 B2 | * | 7/2011 | Pereira ................. | H05K 3/4015 428/209 |
| 9,017,113 B2 | | 4/2015 | Haga | |
| 9,787,012 B2 | | 10/2017 | Kawaguchi et al. | |

(Continued)

FOREIGN PATENT DOCUMENTS

| | | | | | |
|---|---|---|---|---|---|
| CN | 104466076 B | * | 6/2017 | ............ | H01M 2/206 |
| CN | 104919658 B | * | 9/2017 | ............... | C25D 3/46 |

(Continued)

*Primary Examiner* — Peter G Leigh
(74) *Attorney, Agent, or Firm* — MacMillan, Sobanski & Todd, LLC

(57) ABSTRACT

An electrical connector includes at least one base body with at least one contact portion and at least one connection portion. The connection portion is provided for fastening an electrical conductor. The base body is made of a first material, and a layer of a second material is arranged in a surface area of the contact portion. An electrical connector that ensures reliable electrical contacting even under heavy mechanical stresses is realized by applying the layer of the second material by means of roll cladding or an additive manufacturing process.

13 Claims, 8 Drawing Sheets

(56) References Cited

U.S. PATENT DOCUMENTS

| | | | |
|---|---|---|---|
| 2003/0175550 A1* | 9/2003 | Rumbach | H01R 13/03 200/266 |
| 2007/0036670 A1* | 2/2007 | Pereira | C22C 30/00 420/561 |
| 2007/0105412 A1* | 5/2007 | Hoepfner | C22C 1/002 439/83 |
| 2007/0231594 A1* | 10/2007 | Pereira | B23K 35/262 428/615 |
| 2007/0292708 A1* | 12/2007 | Pereira | C03C 27/046 228/122.1 |
| 2008/0057799 A1* | 3/2008 | Pereira | H01R 43/16 439/876 |
| 2015/0194756 A1* | 7/2015 | Guenter | H01R 12/585 439/887 |

FOREIGN PATENT DOCUMENTS

| | | | | |
|---|---|---|---|---|
| CN | 110720160 A | * | 1/2020 | H01R 13/03 |
| DE | 102018212397 A1 | * | 1/2020 | |

* cited by examiner

ELECTRICAL CONNECTOR AND METHOD OF MAKING AN ELECTRICAL CONNECTOR

BACKGROUND OF THE INVENTION

The invention relates to an electrical connector and a method for manufacturing an electrical connector.

A typical electrical connector has at least one base body with at least one contact portion and at least one connection portion. The contact portion is for establishing electrical contact with at least one further connector. The connection portion is provided for fastening at least one electrical conductor to the electrical connector, for example, by fastening the electrical conductor to the connection portion in a substance-to-substance manner. The base body is made of a first material. For example, the first material is a sheet of a metal. The base body has at least one layer of a second material in at least one surface region of the contact portion.

In the prior art, it is known to provide the base body completely with a coating that is applied by galvanizing, for example. The application of the coating can serve, on the one hand, to change the optical appearance of the base body or, on the other hand, to modify the electrical properties.

One field of application of electrical connectors is, for example, electrical plug connectors. In a terminal housing of an electrical plug connector, a plurality of electrical connectors are usually arranged as contacts. When connecting the electrical plug connector with a corresponding plug connector, the electrical connectors are contacted with corresponding electrical connectors in their contact portions.

With increasing reliability demands, for example in the automotive sector, the vibration requirements for plug connectors, among other things, are rising. The greatest challenge is to achieve an increase in vibration resistance without geometric changes to the existing plug connectors, housings, and interfaces. Furthermore, application areas are known in which the electrical connectors have to withstand a large number of connection processes.

Electrical connectors known from the state of the art have the disadvantage that they are damaged in the event of strong and/or permanently occurring vibrations, as a result of which electrical contacting can no longer be ensured or can no longer be ensured reliably enough.

This invention is, therefore, based on the task of providing an electrical connector and a method of manufacturing an electrical connector that ensure reliable electrical contacting, even under severe mechanical stresses.

SUMMARY OF THE INVENTION

The aforementioned task is solved by an electrical connector wherein, in at least one surface area of the contact portion, the layer of the second material is applied by means of roll cladding or an additive manufacturing process. Preferably, the layer of the second material is applied directly to the first material of the base body and, in particular, is materially bonded to the first material. Preferably, the first material and the second material are different. The first material and the second material are electrically conductive, preferably metallic, materials.

The at least one surface area preferably extends over a portion of the contact portion or extends completely over the contact portion.

By roll cladding, the base body made of a first material and the layer made of the second material are bonded together. Roll cladding is carried out, for example, as cold roll cladding or hot roll cladding. In this process, the two materials to be joined are rolled between two plain rolls so that a material-to-material bond is created by high compressive normal stresses and the surface enlargements. This bond can be strengthened by further rolling or by subsequent annealing.

Additive manufacturing processes for applying the second layer may include, for example, direct metal laser sintering (DMLS), electron beam melting (EBM), selective laser sintering (SLS), selective laser melting (SLM), metal binder jetting, or nano-particle jetting. The use of other additive manufacturing processes to deposit at least one layer of the second material is also intended to be within the scope of this invention.

Electrical contacting in the contact portion takes place, for example, by at least force-locking connection with a corresponding electrical connector. For this purpose, the contact portion has at least one plug blade or at least one plug receptacle, for example.

The connection portion is provided for attaching an electrical conductor, for example, a cable with a stranded wire or a distribution bar. For example, the electrical conductor can be welded to the connection portion, for example, by means of ultrasonic welding or soldering. Furthermore, it is also provided that the connection portion includes at least one crimp connector. In particular, it is provided that at least one electrical conductor can be crimped to the connection portion or is crimped to the connection portion. The connection portion may have, for example, at least in some areas, an embossing and/or a corrugated surface in order to provide a larger contact area, in particular for a welded or soldered connection. It is further provided that a crimp connector with a groove embossing is formed in the connection portion.

Compared with the prior art, the application of the second layer by roll cladding or an additive manufacturing process has the advantage that greater layer thicknesses can be achieved than with galvanizing, for example. The greater layer thicknesses of the second layer prevents the second layer from being worn through by micro-movements when used in environments subject to high vibration loads or by a large number of joining processes.

Another advantage is that the resilience of the connector is increased without the need to change the contact geometry or modify the stamping and injection molding tools.

A first embodiment of the connector provides that the contact portion includes at least one plug blade that, in particular, is formed as at least one plug blade. At least one layer of the second material is arranged in at least one surface region of the plug blade. Preferably, this is a surface region that serves as a contact surface of the plug blade for establishing an electrical contact when the plug blade is inserted into a corresponding plug receptacle.

Preferably, the layer of the second material is arranged respectively in two surface areas of the plug blade. The two surface areas in which the layer of the second material is arranged are preferably arranged opposite one another. Preferably, the plug blade has a thickness of between 0.4 mm and 1.2 mm, in particular a thickness of 0.4 mm, 0.6 mm, 0.8 mm, 1 mm, or 1.2 mm. The thickness is inclusive of the one layer or both layers of the second material. At least one transition region is provided between each layer of the second material and the base body or the remaining contact portion. The transition region preferably has an extension of between 0.5 mm and 3.0 mm and, in particular, a maximum of 2.0 mm.

According to an alternative embodiment of the connector, it is further provided that the contact portion includes at least one plug receptacle for receiving at least one plug blade, and that the surface area with the layer of the second material is arranged within the plug receptacle. The surface area with the at least one layer of the second material is arranged within the plug receptacle such that it comes into contact with a plug blade insertable into the plug receptacle. In particular, it is provided that only the surface regions within the plug receptacle that come into contact with a plug blade that can be inserted have at least one layer of the second material. Preferably, a layer of the second material is arranged in two, three, four, five, six, seven, or eight surface regions.

It has been found to be advantageous for the manufacture of the electrical connector if it is provided that the plug receptacle is formed by folding the base body. The electrical connector is preferably made predominantly from a metallic sheet material. During manufacture, for example, a blank of the connector is cut or stamped out of the sheet material, and this is formed, at least partially, into a plug receptacle in the contact portion by folding individual areas several times. If necessary, individual areas are joined by means of clinching, caulking, or welding.

In particular, in order to facilitate mating with a further connector according to a further embodiment of the connector, it is provided that the plug receptacle has at least one first contact element, that the first contact element can be deflected against a spring force, and that the at least one layer of the second material is arranged at least in a surface region of the contact element.

The contact element preferably projects into the plug receptacle and is deflected against a spring force when a plug blade is inserted so that the contact element bears against the plug blade under the action of the spring force and establishes an electrically conductive connection. The surface area with the layer of the second material is arranged on the contact element, in particular in such a way that the layer of the second material is also in contact with a plug blade when it is inserted.

In order to further improve contacting with a plug blade according to a further embodiment of the connector, it is provided that the plug receptacle has at least one second contact element, and that the first contact element and the second contact element are arranged opposite one another and can be moved apart against a spring force. If a plug blade is inserted into the plug receptacle, both contact elements are preferably deflected against a spring force and, under the action of the spring force, rest against the plug blade after it has been inserted.

Preferably, a layer of the second material is arranged in at least one surface area on each of the two contact elements so that the plug blade is contacted on both sides of a contact element with the layer of the second material.

According to a further embodiment of the connector, it has proved particularly advantageous if it is provided that the first contact element and/or the second contact element has a plurality of contact lamellae, in particular respectively, at least three, four, five, six, seven, or eight contact lamellae. Preferably, six contact lamellae are arranged on each side of the plug receptacle, which can be deflected under the action of a spring force when a plug blade is inserted. In particular, the contact lamellae are aligned parallel to one another. The contact lamellae are preferably connected to one another at their ends.

Preferably, at least one layer of the second material is arranged in at least one surface area of each contact lamella.

In order to always ensure contacting of the second layer, it is preferably provided that the surface area with the second layer extends over the entire surface of each contact lamella. Preferably, the each of the lamellae have a thickness of 0.45 mm.

Preferably, in order to further stabilize the plug receptacle according to a further embodiment of the electrical connector, it is provided that the plug receptacle is at least partially surrounded by a spring box. The spring box defines an insertion opening for a plug blade and has at least one latching means for fastening the electrical connector, in particular, in a receptacle housing. In particular, it is provided that at least one coding means is provided on at least one outer surface of the spring box in order to define a preferred insertion direction when the connector is mounted in a receptacle housing.

Preferably, a secondary locking means is provided on at least one outer surface of the spring box that, together with the latching means, ensures that the connector is firmly latched after insertion in a receptacle housing. In the assembled state, the secondary locking means interacts with a slider on the receptacle housing and locks the spring box in a form-fitting manner.

According to a further embodiment of the connector, it is also advantageous if it is provided that the spring box is produced from a sheet metal blank by bending, and that the end edges of the sheet metal blank that are adjacent to one another by bending are connected to one another by a form-fit and/or material-fit. Preferably, the adjacent end edges of the sheet metal blank are joined together by means of a dovetail joint and/or a welded joint. In this way, advantageous stability of the spring box is ensured.

In a further embodiment of the connector, it is provided that the spring box is fastened to the base body in a force-fitting and/or a form-fitting manner. The spring box has, for example, a cutout in each of two opposite side faces. Within each cutout, at least one, and preferably two, connecting wings are provided that are caulked for connection to the base body. The cutout allows the caulking to be carried out in a simple manner.

In particular, in order to influence the external appearance of the connector or to change its electrical properties according to a further embodiment, it is provided that the first material and the second material are covered by a layer of a third material that, in particular, is applied by galvanizing and/or a similar electroplating process. The base material and the layer of the second material thus receive a protective layer of a third material, which is preferably applied by galvanizing.

According to a further embodiment, it has been found to be particularly advantageous if the layer of the second material has a thickness of between 12.0 µm and 150.0 µm. Preferably, the layer of the second material has a thickness of between 12.0 µm and 50.0 µm. In tests, it has been shown that abrasion of the second layer occurs in the range of about 25.0 µm under particularly high vibration loads. Thicknesses of the layer of about 25.0 µm or about 35.0 µm are therefore particularly preferred.

According to a particularly preferred embodiment of the connector, it is provided that the first material is copper or a copper alloy and/or that the second material is silver or a silver alloy. AgNi015 or AgCu3 have been found to be particularly preferred silver alloys.

The above-mentioned task is further solved by a connector system including a first electrical connector and second electrical connector, wherein the first electrical connector and the second electrical connector are connectable to each other in their contact portions. Preferably, the first electrical connector is formed as a plug with a plug blade, and the second electrical connector is formed as a socket with a plug receptacle. The first electrical connector and/or the second electrical connector are formed according to any of the preceding embodiments. Consequently, the plug blade and/or the plug receptacle has a surface area with at least one layer of the second material, or both components have such a layer.

The task mentioned at the beginning is further solved by a method for manufacturing an electrical connector. The method includes at least the following method steps of: providing at least one sheet metal strip or sheet metal made of a first material; at least partially coating the sheet metal strip or sheet metal with at least one strip of a second material by roll cladding or an additive manufacturing process; separating at least one blank for an electrical connector from the sheet metal strip or sheet metal including the surface area with the strip of the second material so that the strip of the second material lies in the contact portion of a connector that can be produced from the blank; and forming an electrical connector including at least one connection portion and at least one contact portion from the blank.

The coating is applied to part of the surface of the sheet metal strip or sheet metal, preferably in a strip whose longitudinal extent is significantly greater than its width. The strip of the second material is therefore positioned on the sheet metal strip or sheet metal of the first material in such a way that after it has been cut out, it lies exactly in the area of the cut-out blank in which the contact portion is located. The sheet metal strip is preferably wound as a so-called coil and has an extension in a longitudinal direction that is significantly greater than an extension in a transverse direction thereto. The sheet metal strip is preferably made of copper or a copper alloy, and the second material is preferably silver or a silver alloy.

The method is preferably used to form a connector according to one of the embodiments described above.

According to a first embodiment of the method, it is provided that the following method step further includes forming the electrical connector by folding the blank so that the contact portion has at least one plug receptacle.

Consequently, the blank is folded to form a plug receptacle for receiving at least one plug blade.

According to a further embodiment of the method, it has also been found advantageous if the following method steps are included: arranging a spring box surrounding the plug receptacle; and fixing the spring box to the base body by caulking at least one connecting wing.

Further advantageous embodiments of the invention are apparent from the following description of the figures and the dependent claims.

DETAILED DESCRIPTION OF THE PREFERRED EMBODIMENTS

Regarding the following description, it should be noted that the invention is not limited to the embodiments illustrated herein and, thereby, not limited to all or several features of described feature combinations. Rather, each individual partial feature of the/each embodiment is also of importance for the subject matter of the invention detached from all other partial features described in connection therewith for itself and also in combination with any features of another embodiment.

Figure 1:
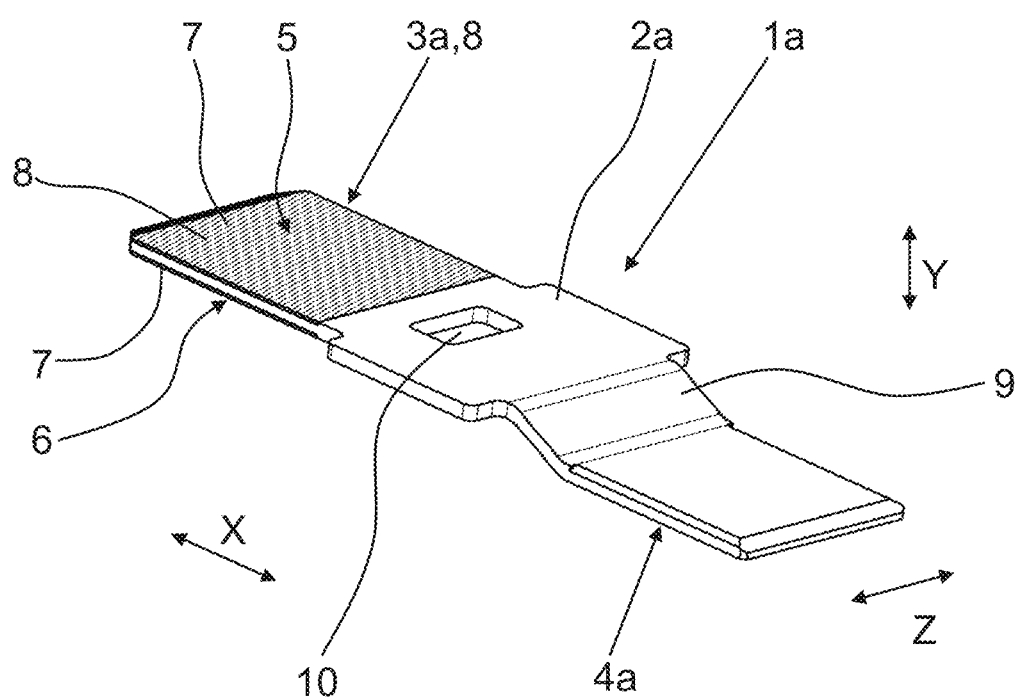
FIG. 1 is a perspective view of an electrical connector including a plug blade in accordance with this invention.

FIG. 1 shows a first embodiment of an electrical connector 1a in a perspective view. The electrical connector 1a has a base body 2a with a contact portion 3a and a connection portion 4a. In the longitudinal direction of the connector 1a (i.e., in the direction of the double arrow X), the contact portion 3a and the connection portion 4a are disposed at opposite ends of the connector 1a. The contact portion 3a is provided for electrically contacting with at least one other connector (such as shown, for example, at 1b in FIGS. 2 and 3). The connection portion 4a is provided for fastening (such as, for example, by welding, soldering, or crimping) an electrical conductor (not shown). The base body 2 is made of a first material, such as copper. Both in a first surface area 5 of the contact portion 3a and in a second surface area 6 of the contact portion 3a, respectively, a layer 7 of the second material (such as, for example, an alloy of silver and nickel) is arranged.

In this first embodiment, the contact portion 3a is formed as a plug blade 8. The first surface area 5 and the second surface area 6 are arranged here opposite each other on the plug blade 8 so that the plug blade 8 can be contacted on both sides via the layer 7 made of the second material. The first surface area 5 and the second surface area 6 each extend over almost the entire surface of the plug blade 8 on the respective side. In the first embodiment of FIG. 1, the base body 2a includes an angled transition region 9 to the connection portion 4. The transition region 9 is angled relative to the base body 2 in the Y direction. Furthermore, the illustrated base body 2a has a substantially rectangular recess 10, which is arranged, for example, centrally.

Figure 2:
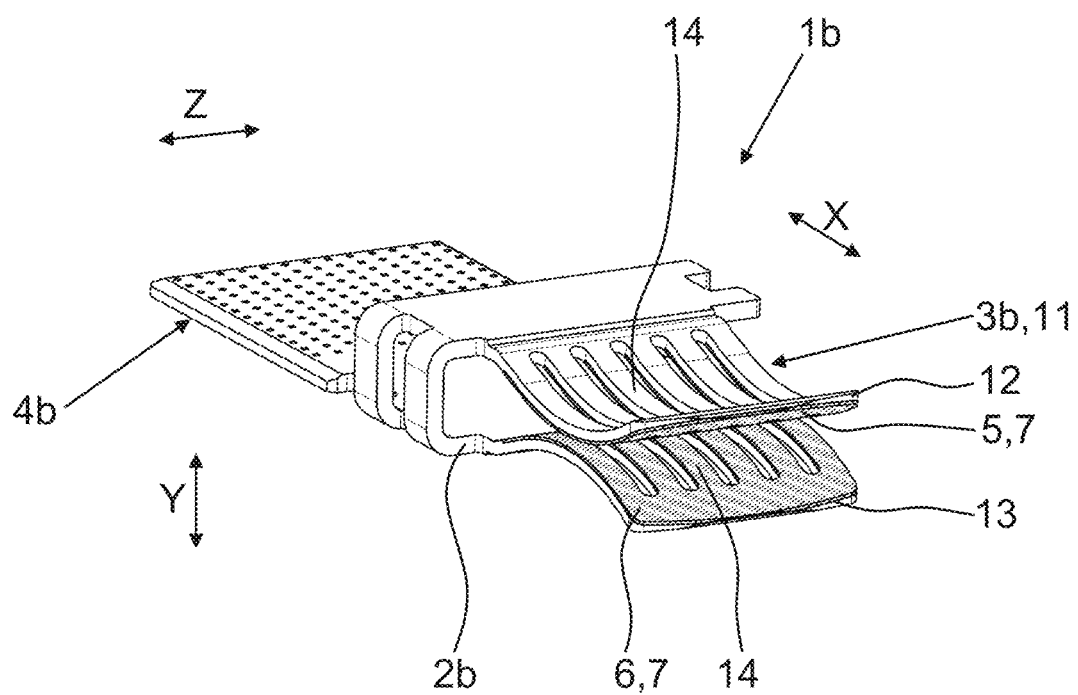
FIG. 2 is a perspective view of an electrical connector including a plug receptacle in accordance with this invention.

FIG. 2 shows a second embodiment of an electrical connector 1b in a perspective view. The electrical connector 1b has a base body 2b with a contact portion 3b and a connection portion 4b. In this second embodiment, the contact portion 3b is formed as a plug receptacle 11. In the longitudinal direction of the connector 1b (i.e., along the double arrow X), the contact portion 3a and the connection portion 4a are arranged at opposite ends of the connector 1b. The plug receptacle 11 is formed by folding the base body 2b a plurality of times and has a first contact element 12 and a second contact element 13, each having six contact lamellae 14. The contact lamellae 14 are formed by cutting out the base body 2 and are connected to each other at their ends. The contact lamellae 14 are evenly spaced apart in a Z direction.

Figure 4:
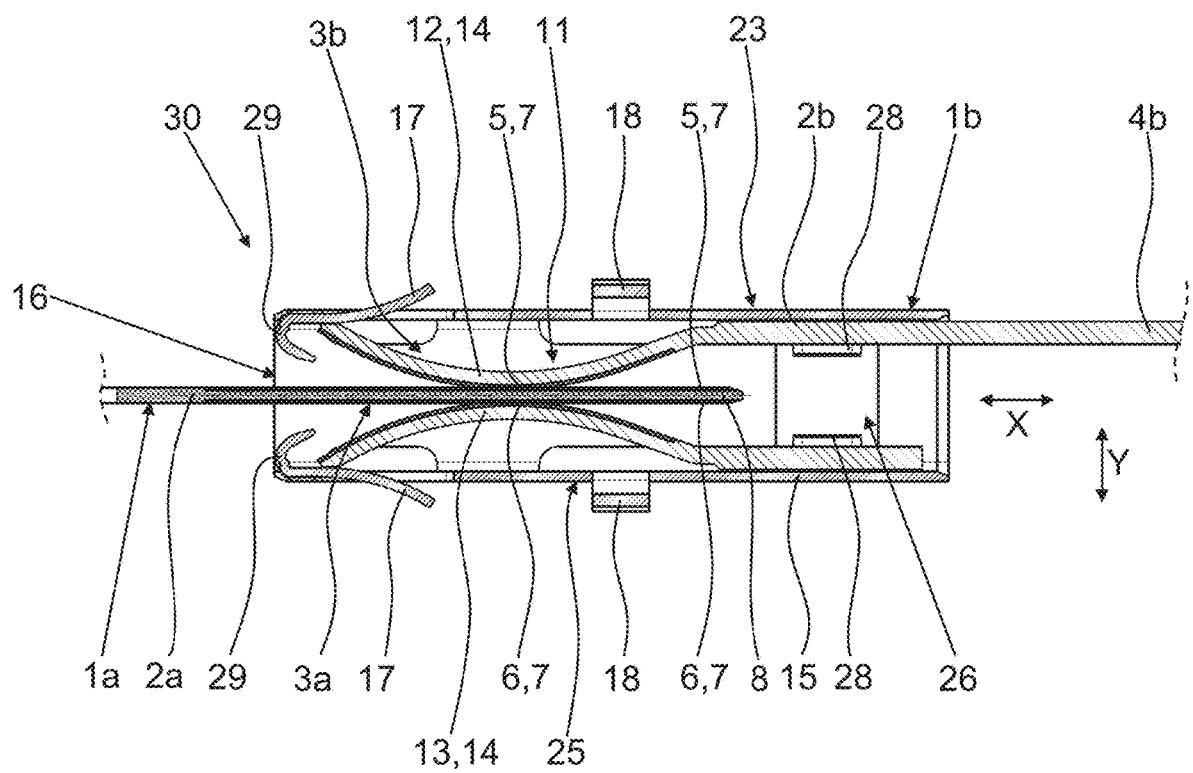
FIG. 4 is a sectional side elevation view of the assembly of the plug receptacle and spring box illustrated in FIG. 3 showing the plug blade illustrated in FIG. 1 inserted therein.

The first contact element 12 and the second contact element 13 are convexly curved over their longitudinal extent along the X direction of the connector 1b such that the convex curvature sections extend towards each other. Along the double arrow X, a plug blade 8 (such as, for example, according to FIG. 1) is also inserted into the plug receptacle 11. When a plug blade 8 is introduced into the plug receptacle 11 (such as shown in FIG. 4), the first contact element 12 and the second contact element 13 (and in particular the contact lamellae 14) move apart against a spring force, in particular along the direction of the double arrow Y. The first contact element 12 and the second contact element 13 (and in particular the contact lamellae 14) move apart against a spring force. This causes a contact force on the plug blade 8.

A first layer 7 of the second material is disposed in a first surface area 5 of the first contact element 12. The first surface area 5 extends substantially over the entire contact element 12, including all contact lamellae 14 and their connection at the ends. In the longitudinal direction (the X direction), the first layer 7 extends substantially over the entire convexly curved area of the contact elements 12, 13, and in particular over the entire width (i.e., the Z direction) of the contact elements 12, 13.

A second layer 7 of the second material is further disposed in a second surface area 6 of the second contact element 13. The second surface area 6 extends substantially completely over the second contact element 13, including all contact lamellae 14 and their connection at the ends.

The connection portion 4b is at least partially embossed, increasing its area.

Figure 3:
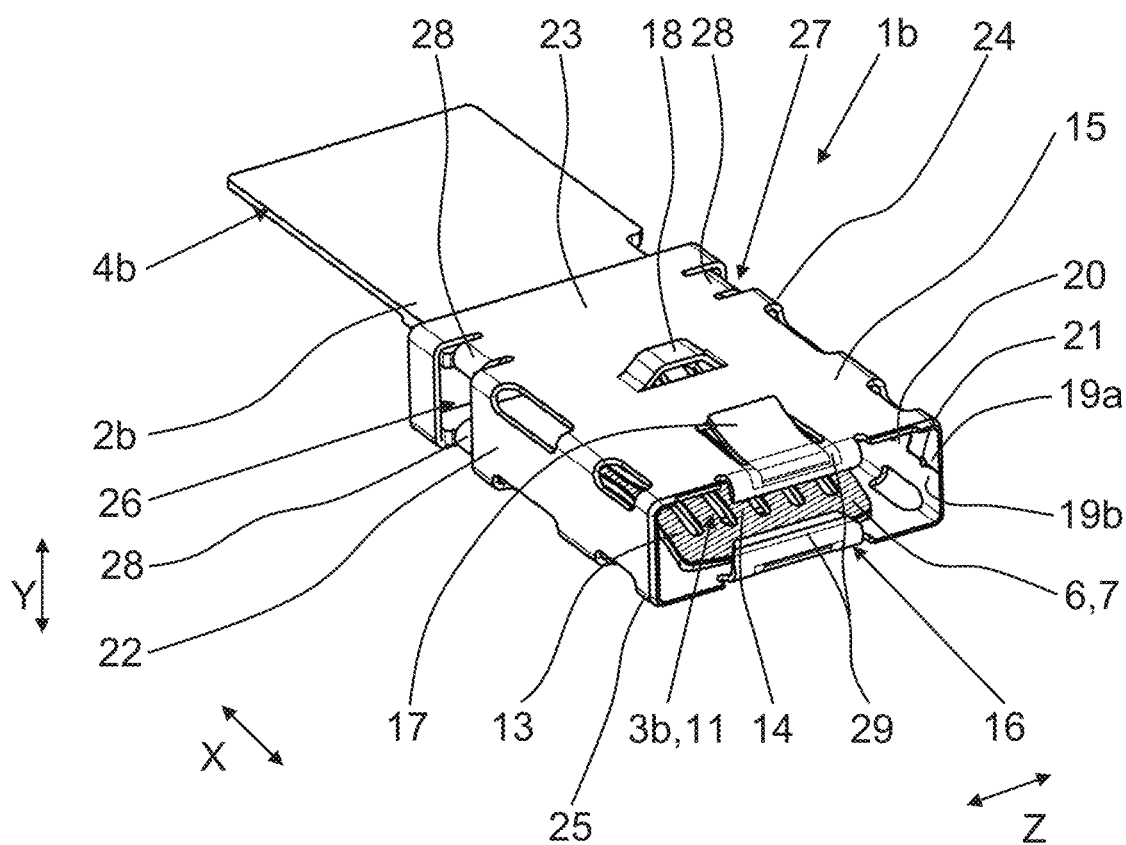
FIG. 3 is a perspective view of the electrical connector illustrated in FIG. 2 having a spring box supported thereon.

FIG. 3 shows the second embodiment of the electrical connector 1b, whose base body 2b is formed with the contact portion 3b, the connection portion 4b, and the plug receptacle 11 according to the embodiment of FIG. 2, having a spring box 15 supported thereon.

Compared to the embodiment of FIG. 2, the plug receptacle 11 according to FIG. 3 is surrounded by the spring box 15 that defines an insertion opening 16 such as, for example, for the plug blade 8 according to the embodiment of FIG. 1. The spring box 15 further includes at least one resilient latching means 17 for securing the spring box 15 in a receptacle housing (not shown). In addition to the latching means 17, the spring box 15 also includes a secondary locking means 18 that is oriented transversely to the insertion direction, which is oriented along the double arrow X. The secondary locking means 18 is oriented in the Z direction and protrudes from the spring box 15 in the Y direction. The secondary locking means 18 and the latching means 17 are cut out of the spring box 15 and formed out by bending. Together with the latching means 17, the secondary locking means 18 serves to fix the spring box 15 and thus the electrical connector 1b, in a receptacle housing (not shown). In the assembled state, the secondary locking means 18 interacts with a slider (not shown) of the receptacle housing. The slider interacts in a form-fitting manner with a side edge of the secondary locking means 18.

The spring box 15 is made from a sheet metal blank by bending so that end edges 19a, 19b, which are brought into contact with each other by the bending, are connected to each other both by a dovetail joint 20 and by a welded joint 21. This increases the stability of the spring box 15.

The illustrated spring box 15 has a substantially rectangular cross-section with four side surfaces 22, 23, 24 and 25.

In the side surface 22, the spring box 15 has a first cutout 26 and, in the side surface 24, the spring box 15 has a second cutout 27. The spring box 15 is connected to the base body 2b in that a total of four connecting wings 28 arranged in the cutouts 26, 27 are bent over and caulked to the base body 2b.

In the area of the insertion opening 16, the spring box 15 has two oppositely arranged limiting means 29 that, in the illustrated embodiment, are formed as bent-over material edges. The limiting means 29 serve to limit the movement of the first contact element 12 and the second contact element 13 when the plug blade 8 is inserted such as, for example, shown in FIG. 4. A limitation of the movement of the contact elements 12, 13 in the X direction takes place.

FIG. 4 shows an embodiment of a connector system 30 with the first connector 1a according to FIG. 1 inserted into the second connector 1b and spring box 15 according to FIG. 3. The first connector 1a has been inserted into the second connector 1b along the X-direction. The plug blade 8 of the first connector 1a, with the opposing surface areas 5, 6 having the layers 7 of the second material, presses the first contact element 12 and the second contact element 13 apart against a spring force (in the Y-direction) so that both (1) the layers 7 of the second material inside the plug receptacle 11 and (2) the layers 7 on the outside of the plug blade 8 lie against each other in contacting manner under the effect of a contact force. The layers 7 on the plug blade 8 extend at least over the length of the plug blade 8 introduced into the plug receptacle 11. The layers 7 of the plug receptacle 11 extend from the end region (shown on the left in FIG. 4) of the plug receptacle 11 to just before a bend in the contact elements 12, 13, advantageously over the entire longitudinal extent of the curved regions of the contact elements 12, 13.

The layers 7 of the second material, on both of the contact elements 12, 13 and on both sides of the plug blade 8, always ensure sufficient contact between the first connector 1a and the second connector 1b, even in the presence of strong vibrations or a large number of mating operations.

The spring box 15 has the secondary locking means 18 and the latching means 17 on each of the opposite side surfaces 23, 25. The connecting wings 28 are force-locked to the base body 2b within the recess 26.

In the contact portion 3b, in particular the area of the contact elements 12, 13, the base body has a thickness of about 0.45 mm, in the area of the connection portion 4b a thickness of about 0.6 mm.

Figure 5:
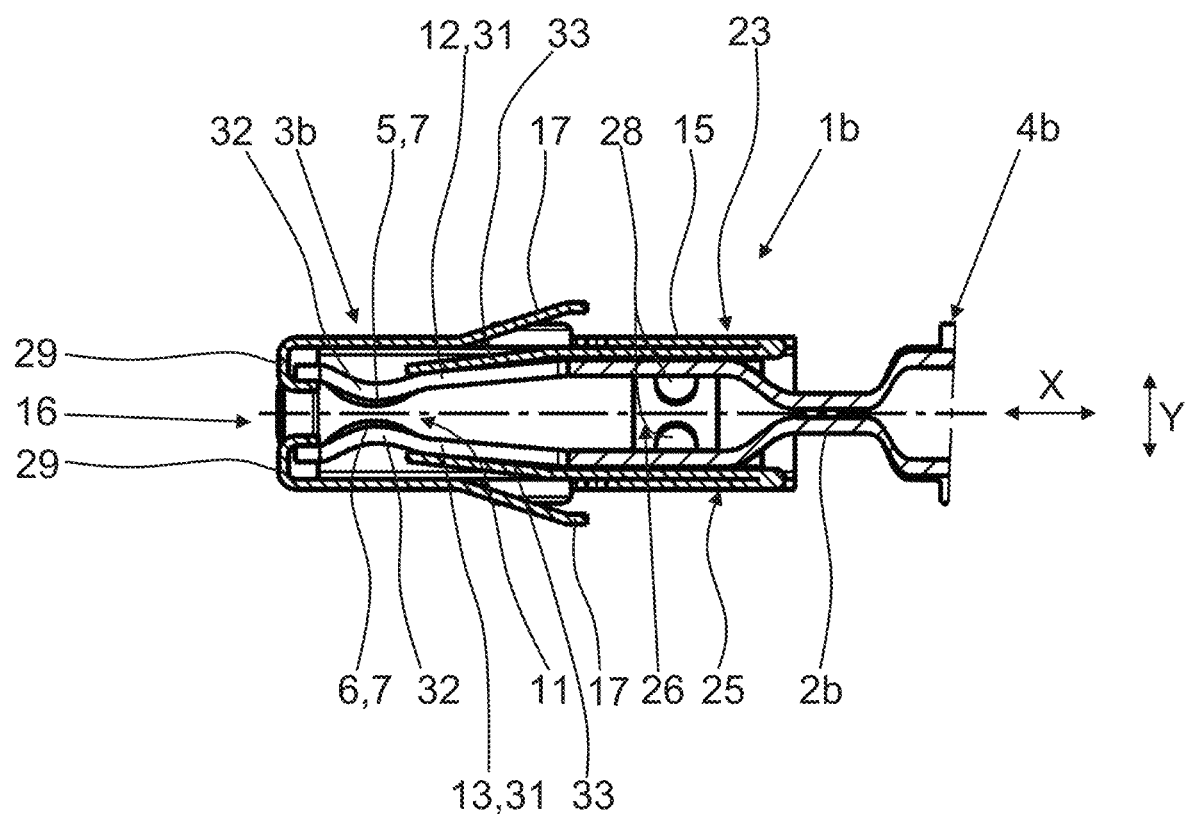
FIG. 5 is a sectional side elevational view of an alternative embodiment of the assembly of the plug receptacle and spring box illustrated in FIGS. 3 and 4.
Figure 6:
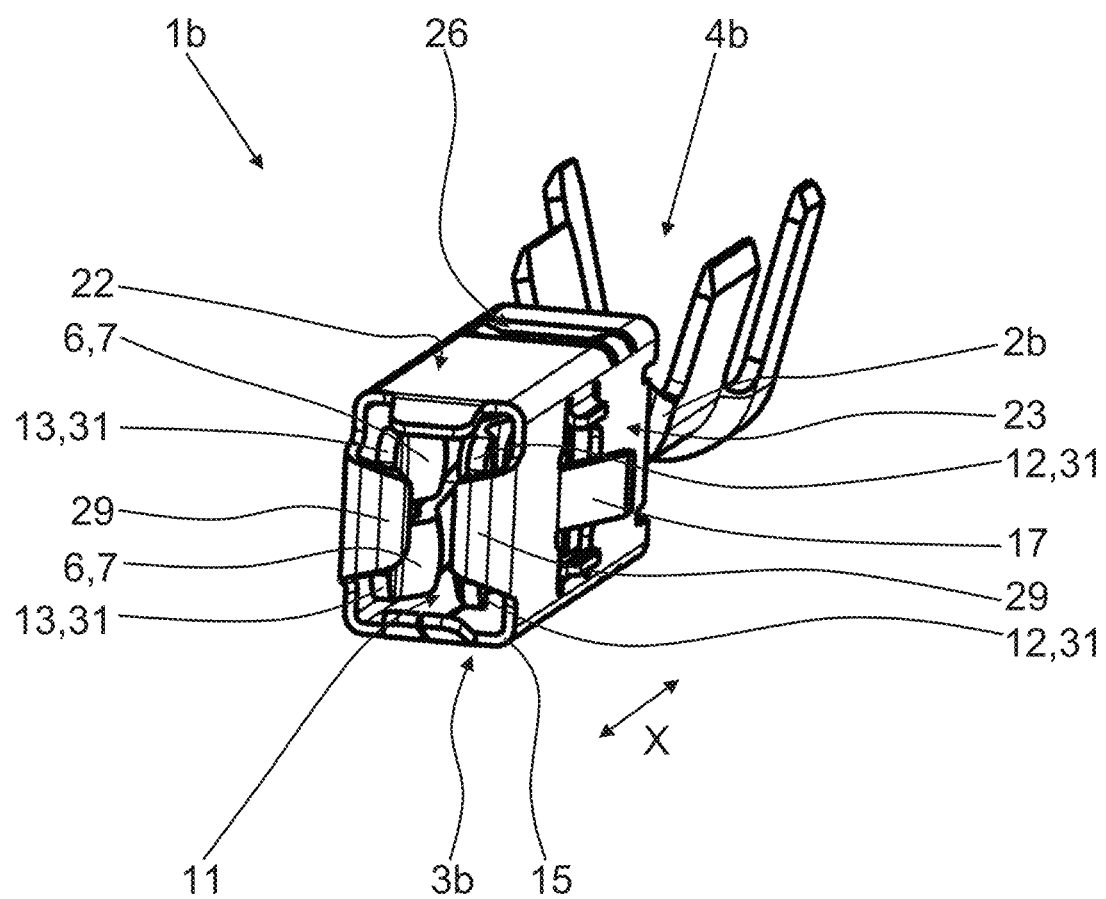
FIG. 6 is a perspective view of the alternative embodiment of the assembly of the plug receptacle and spring box illustrated in FIG. 5.

FIG. 5 shows an alternative embodiment of the assembly of the plug receptacle and spring box illustrated in FIGS. 3 and 4, which is also shown in perspective view in FIG. 6. In the alternative embodiment shown in FIGS. 5 and 6, the electrical connector 1b has a modified contact portion 3b and a modified connection portion 4b. In particular, the modified connection portion 4b is formed as a crimp connector. The modified contact portion 3b has a plug receptacle 11 with opposing contact elements 12, 13 that can be moved apart in the Y direction against a spring force. The first surface area 5 the layer 7 of the second material is arranged on the first contact element 12, and the second surface area 6 with the layer of the second material is arranged on the second contact element 13.

Each of the contact elements 12, 13 has two separate and adjacent contact arms 31. The contact arms 31 each have a section 32 with a convex curvature, the sections 32 with the convex curvature being directed towards one another. In the sections 32 with the convex curvature, the respective layers 7 of the second material are arranged, which makes contact when a plug blade 8 is inserted. The plug receptacle 11 is, in turn, surrounded by a spring box 15, which has two latching means 17 and two limiting means 29.

The spring box 15 has a recess 26, 27 in each of two opposite side surfaces 22, 24, of which one recess 26 is visible in FIG. 5 and FIG. 6. Two connecting wings 28 are arranged in the recess 26, which are caulked to the base body 2*b*. The spring box 15 further has support arms 33 which support the spring action of the contact arms 31.

Figure 7:
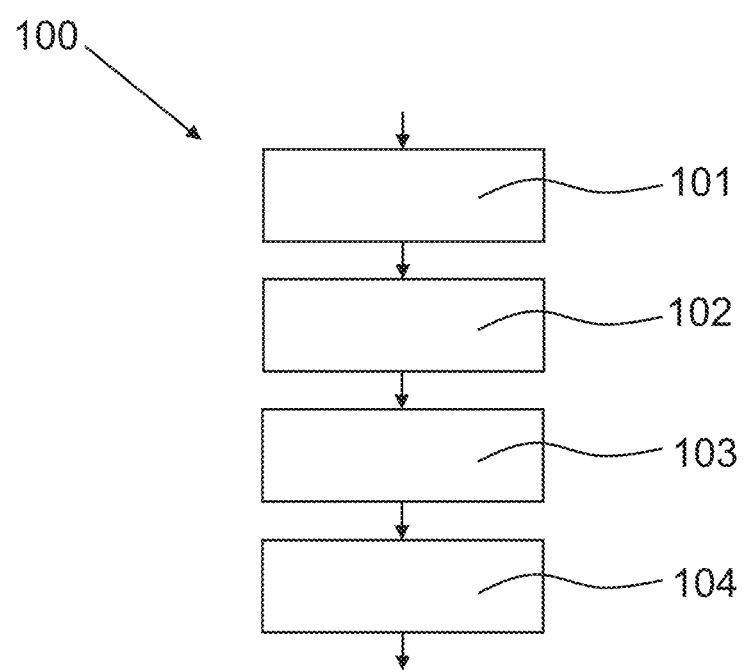
FIG. 7 illustrates a schematic sequence of a first embodiment of a method in accordance with this invention.

FIG. 7 shows a schematic sequence of a first embodiment of a process 100 for manufacturing an electrical connector 1*a*, 1*b*. First, in an initial step 101, a sheet of a first material such as, for example, copper is provided.

Subsequently, in a second step 102, the sheet is at least partially coated with at least one strip of a second material, in this case a silver-nickel alloy, by means of roll cladding or an additive manufacturing process.

Subsequently, in a third step 103, cutting out of at least one blank for an electrical connector 1*a*, 1*b* from the sheet metal, including the surface area 5, 6 with the strip of the second material, takes place so that the strip of the second material lies in the contact portion 3*a*, 3*b* of a connector 1*a*, 1*b* that can be produced from the blank.

Finally, in a fourth step 104, forming of a connector 1*a*, 1*b* includes at least one contact portion 3*a*, 3*b* and at least one connection portion 4*a*, 4*b* is performed from the blank.

Figure 8:
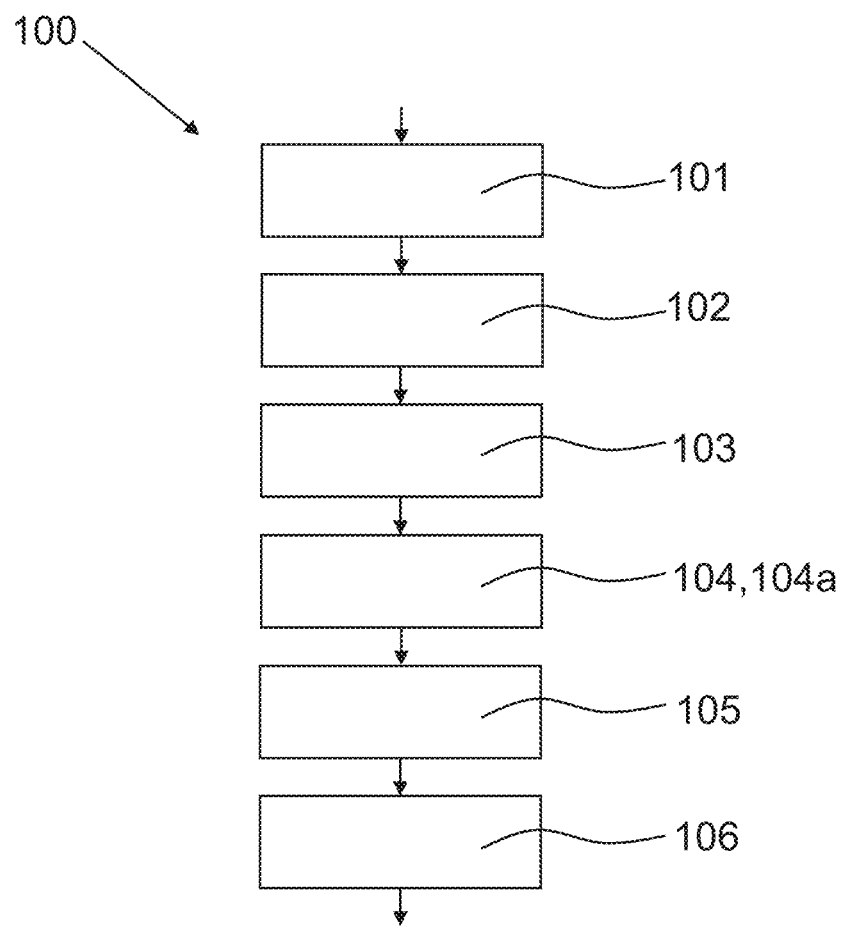
FIG. 8 illustrates a schematic sequence of a second embodiment of a method in accordance with this invention.

FIG. 8 shows a second embodiment of a schematic sequence of a process 100 for manufacturing an electrical connector 1*a*, 1*b*. In addition to the process steps already described for the embodiment of FIG. 7, a step 104*a* of forming of the connector is carried out by folding the blank so that the contact portion 3*b* has at least one plug receptacle 11. Furthermore, a step 105 of arranging the spring box 15 surrounding the plug receptacle 11 and a step 106 of fixing of the spring box 15 to the base body 2*b* are performed by caulking at least one connecting wing 28 to the base body 2*b*.

The invention is not limited to the embodiments shown and described, but also includes all embodiments having the same effect in the sense of the invention. It is expressly emphasized that the embodiments are not limited to all features in combination. Rather, each individual sub-feature may also have inventive significance in isolation from all other sub-features. Furthermore, the invention has not yet been limited to the combination of features described above, but can also be defined by any other combination of certain features of all the individual features disclosed as a whole. This means that in principle virtually any individual feature of this invention can be omitted or replaced by at least one individual feature disclosed elsewhere in the application.

What is claimed is:

1. An electrical connector comprising:
    at least one base body with at least one contact portion and at least one connection portion, wherein the connection portion is provided for fastening an electrical conductor, wherein the base body is made of at least a first material, and wherein at least one layer of a second material is arranged in at least one surface area of the contact portion, characterized in that:
    the layer of the second material is applied by roll cladding or an additive manufacturing process;
    the contact portion has at least one plug receptacle;
    the surface area with the layer of the second material is arranged inside the plug receptacle;
    the plug receptacle has at least one first contact element;
    the first contact element can be deflected counter to a spring force; and
    a layer of the second material is arranged at least in one surface region of the first contact element.

2. The electrical connector according to claim 1, characterized in that the contact portion has at least one plug blade and the layer of the second material is arranged in at least one surface region of the plug blade.

3. The electrical connector according to claim 1, characterized in that the plug receptacle has at least one second contact element and the first contact element and the second contact element are arranged opposite one another and can be moved apart counter to a spring force.

4. The electrical connector according to claim 1, characterized in that the first contact element and/or the second contact element have a plurality of contact lamellae arranged next to one another.

5. The electrical connector according to claim 1, characterized in that the plug receptacle is surrounded by a spring box, the spring box defines an insertion opening for a plug blade, and the spring box has at least one latching means for fastening the electrical connector.

6. The electrical connector according to claim 5, characterized in that the spring box is made from a sheet-metal blank and the end edges of the spring box, which end edges rest against one another, are connected in a form-fitting and/or material-fitting manner.

7. The electrical connector according to claim 5, characterized in that the spring box is fastened to the base body in a force-locking and/or form-locking manner and the spring box has a cutout in each of two opposite side faces.

8. The electrical connector according to claim 1, characterized in that the first material and the second material are covered by at least one layer of a third material.

9. The electrical connector according to claim 1, characterized in that the at least one layer of the second material has a thickness between 12 µm and 150 µm.

10. The electrical connector according to claim 1, characterized in that the first material is copper or a copper alloy and/or the second material is silver or a silver alloy.

11. A connector system comprising at least one first electrical connector and at least one second electrical connector, wherein the first connector and the second connector are connectable to each other in their contact portions, characterized in that the first connector and/or the second connector are/is formed according to claim 1.

12. A method for manufacturing an electrical connector according to claim 1, characterized in that:
    a sheet metal strip made of a first material is provided,
    the sheet metal strip is at least partially coated with at least one strip of a second material by means of roll cladding or an additive manufacturing process,
    at least one blank for an electrical connector is cut out from the sheet metal strip including the surface area with the strip of the second material so that the strip of the second material lies in the contact portion of an electrical connector which can be produced from the blank,
    an electrical connector having at least one contact portion and at least one connection portion is formed from the blank, and
    a spring box is arranged to at least partially surrounding the plug receptacle, and the spring box is fixed to the base body by caulking at least one connecting wing.

13. The method according to claim 12, characterized in that the electrical connector is formed by folding the blank so that the contact portion has at least one plug receptacle.

* * * * *